(12) United States Patent
Cox et al.

(10) Patent No.: US 10,913,530 B2
(45) Date of Patent: Feb. 9, 2021

(54) COCKPIT CONTROL SYSTEM FOR CONTROLLING GROUND TRAVEL IN AIRCRAFT EQUIPPED WITH ENGINE-FREE ELECTRIC TAXI SYSTEM

(71) Applicant: Borealis Technical Limited, North Plains, OR (US)

(72) Inventors: Joseph J. Cox, Portland, OR (US); Isaiah W. Cox, London (GB); Jan Vana, Prague (CZ); Michael Spillias, Jr., Leesburg, VA (US); Joseph Goldman, Pikesville, MD (US)

(73) Assignee: Borealis Technical Limited, Isle of Man (IM)

( * ) Notice: Subject to any disclaimer, the term of this patent is extended or adjusted under 35 U.S.C. 154(b) by 27 days.

(21) Appl. No.: 16/368,442

(22) Filed: Mar. 28, 2019

(65) Prior Publication Data

US 2019/0217947 A1   Jul. 18, 2019

Related U.S. Application Data

(62) Division of application No. 14/775,342, filed as application No. PCT/US2014/029447 on Mar. 14, 2014, now Pat. No. 10,293,922.

(60) Provisional application No. 61/786,212, filed on Mar. 14, 2013.

(51) Int. Cl.
*B64C 25/40* (2006.01)
*B64D 43/00* (2006.01)
*B64F 5/60* (2017.01)

(52) U.S. Cl.
CPC ............ *B64C 25/405* (2013.01); *B64D 43/00* (2013.01); *B64F 5/60* (2017.01); *Y02T 50/80* (2013.01)

(58) Field of Classification Search
CPC ......... B64C 25/405; B64F 5/60; B64D 43/00; Y02T 50/823
See application file for complete search history.

(56) References Cited

U.S. PATENT DOCUMENTS

| 8,788,117 B2 * | 7/2014 | Frings | B64F 1/227 701/2 |
| 8,897,931 B2 * | 11/2014 | Spinelli | G05D 1/0061 701/3 |
| 2010/0125403 A1 * | 5/2010 | Clark | G09B 29/10 701/120 |

(Continued)

*Primary Examiner* — Valentina Xavier

(57) ABSTRACT

A cockpit control system and method for efficiently controlling ground travel in an aircraft equipped with engine-free electric taxi drive systems are provided. The cockpit control system is configured with a display that provides a maximum amount of information during aircraft ground movement with a minimal amount of input from and distraction to pilots or cockpit crew to facilitate essentially hands free operation and control of aircraft ground travel. System test and drive procedures ensure safe aircraft ground travel with the engine-free electric taxi system. Constant pilot hand or other input is not required to achieve safe and maximally efficient aircraft ground travel powered by the aircraft's engine-free electric taxi drive systems or, under selected defined conditions, by the aircraft's engines to achieve this maximum efficiency. The system may further be designed to be uninterruptible by unauthorized persons.

15 Claims, 8 Drawing Sheets

(56) References Cited

U.S. PATENT DOCUMENTS

| | | | |
|---|---|---|---|
| 2011/0290933 A1* | 12/2011 | Cros | B64C 25/405 244/50 |
| 2012/0018574 A1* | 1/2012 | Bayer | G05D 1/02 244/50 |
| 2012/0217339 A1* | 8/2012 | Gilleran | B64C 25/405 244/50 |
| 2015/0298817 A1* | 10/2015 | Jackson | G08G 5/065 701/3 |
| 2016/0012736 A1* | 1/2016 | Nutaro | G08G 5/065 701/3 |

* cited by examiner

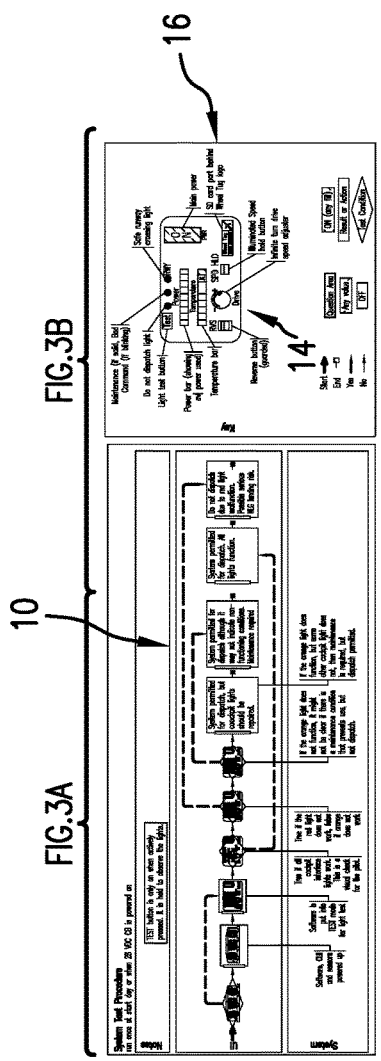
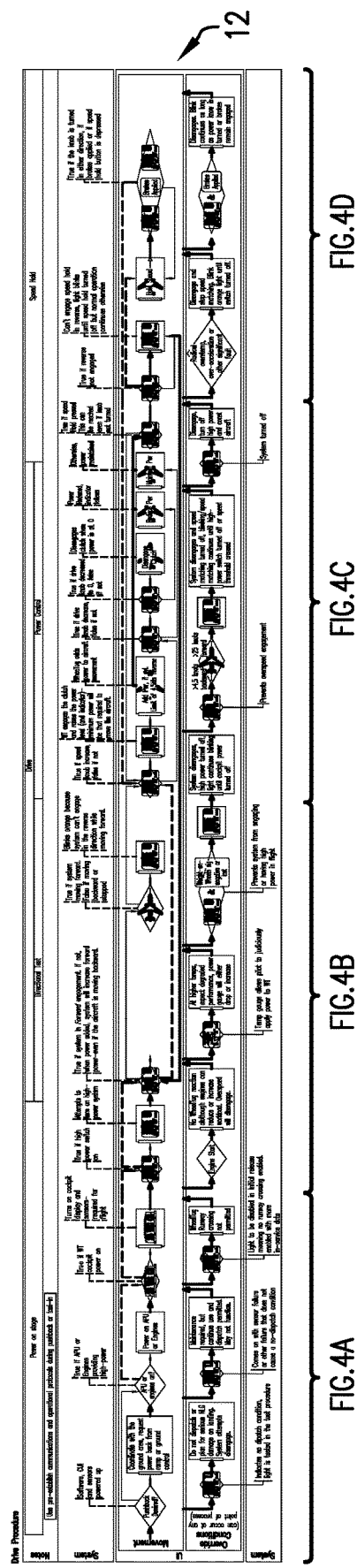

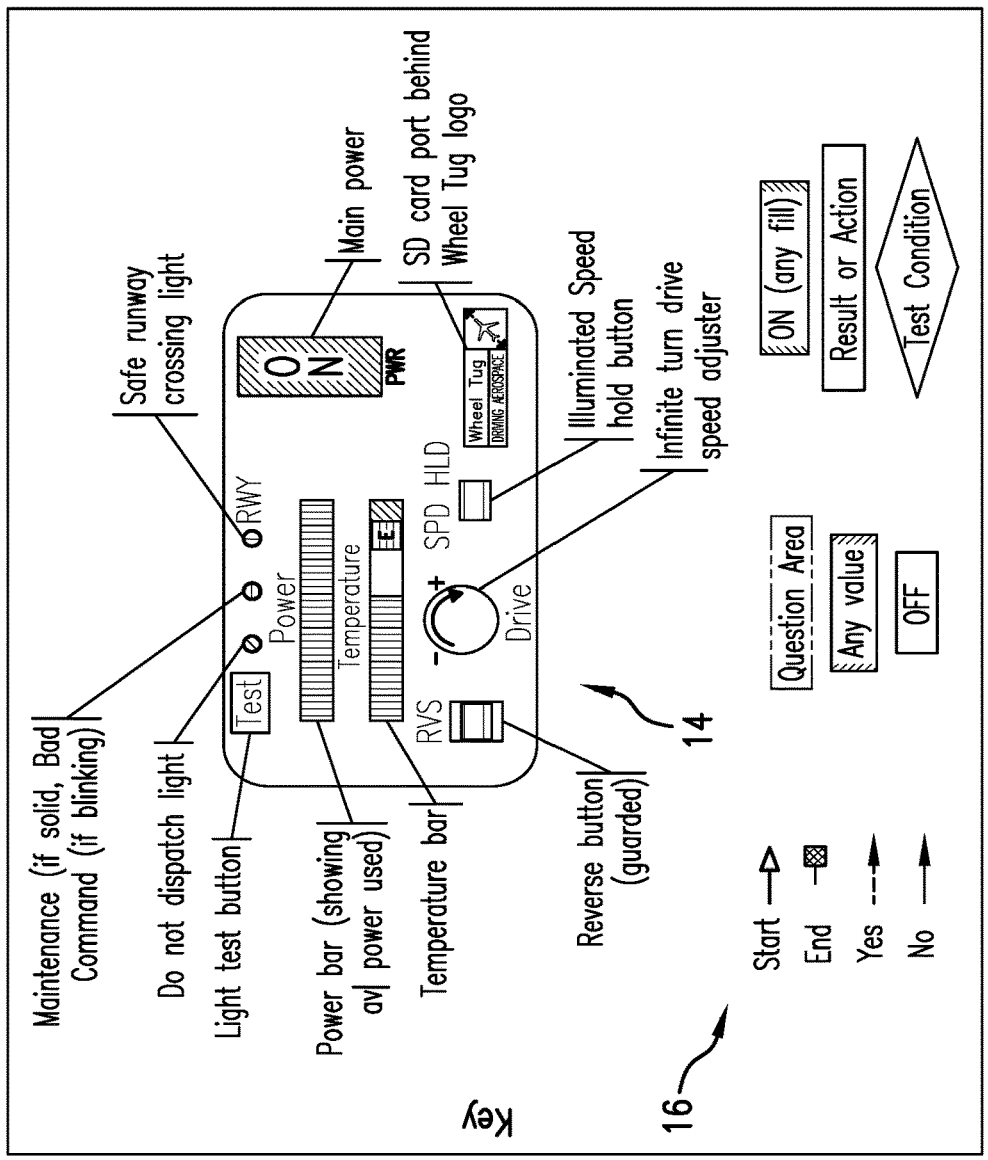
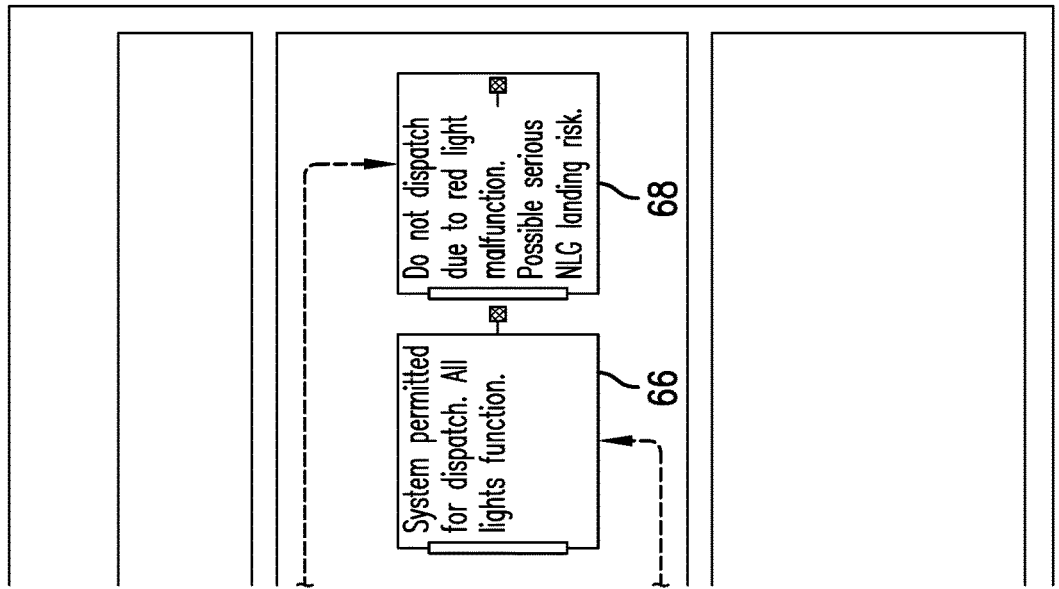
FIG.3B

COCKPIT CONTROL SYSTEM FOR CONTROLLING GROUND TRAVEL IN AIRCRAFT EQUIPPED WITH ENGINE-FREE ELECTRIC TAXI SYSTEM

PRIORITY CLAIM

This application is a division of pending U.S. patent application Ser. No. 14/775,342, filed 28 Dec. 2015, which claims priority from U.S. Provisional Patent Application No. 61/786,212, filed 14 Mar. 2013, the disclosures of the foregoing applications being incorporated herein in their entireties.

TECHNICAL FIELD

The present invention relates generally to aircraft cockpit control systems and particularly to a cockpit control system that facilitates the maximum control of efficient autonomous ground movement in an aircraft equipped with an engine-free electric taxi system.

BACKGROUND OF THE INVENTION

The concept of autonomous aircraft ground travel and taxi without use of the aircraft's main engines or tow vehicles has received much attention lately. Systems designated as "electric taxi" systems to move aircraft during taxi after landing and before takeoff have been proposed by Applicant and others. Such systems are described, for example, in commonly owned U.S. Pat. Nos. 7,975,960 and 8,220,740 to Cox et al and in U.S. Pat. No. 7,445,178 to McCoskey et al, as well as in U.S. Patent Publication Nos. US2011/0089289 to Wilson and US2012/0104158 to Charles et al. Such systems typically suggest the use of one or more electric motors mounted in connection with aircraft main or nose landing gear wheels to drive the wheels and move the aircraft during taxi without requiring operation of the aircraft's main engines or a tow tractor, tug, or other tow vehicle. Implementing this concept, however, has been accompanied by challenges.

One challenge has been to provide a cockpit control system that is easily accessed and used by the aircraft's pilot and cockpit crew to operate an electric taxi system effectively, both alone and in conjunction with the aircraft's engines, to guide the aircraft as required during ground movement. Currently, aircraft are powered during taxi by thrust from the aircraft's engines, which requires the pilot or crew to adjust engine thrust, steer the aircraft, and apply the aircraft's brakes as needed while keeping the surrounding ground environment in view to ensure that the aircraft is traveling along a clear path. An electric taxi system adds a different level of control for which the pilot and crew must be responsible. The presently proposed electric taxi systems require constant pilot hand input and do not provide as much information as is desirable to enable the pilot to follow taxi instructions or move the aircraft during taxi as efficiently as possible. A cockpit system that provides a substantially "hands free" option to guide an aircraft that is not equipped with an electric taxi system during taxi at an airport with a plurality of taxi paths is described in U.S. Pat. No. 8,280,618 to Feyereisen et al. The "hands free" option is accomplished by providing an audio input from the pilot or crew as part of the aircraft's avionics system. It is not suggested whether, or how, this system could be adapted or used to provide the control necessary for an aircraft with an electric or like taxi system that drives the aircraft autonomously during taxi, either alone or in conjunction with operation of the aircraft's engines.

A need exists, therefore, for a cockpit control system and method specifically designed for an aircraft equipped with an engine-free electric taxi system to power ground movement that provides and facilitates optimum control over aircraft ground travel by an aircraft's pilot and cockpit crew and can be operated with minimal mechanical or other input from the pilot and/or crew to achieve a substantially hands free control of aircraft ground travel.

SUMMARY OF THE INVENTION

It is a primary object of the present invention to provide a cockpit control system and method adapted to control ground travel in an aircraft equipped with an engine-free electric taxi system for autonomous ground movement that can be operated easily and with minimal mechanical or other input from a pilot and/or crew to achieve a substantially hands free control of aircraft ground travel.

It is another object of the present invention to provide a cockpit control system and method for controlling ground movement in an aircraft equipped with an engine-free electric taxi system designed to move the aircraft during taxi with selective reliance on operation of the aircraft's main engines only when defined operating conditions of the engine-free electric taxi system are present.

It is an additional object of the present invention to provide a cockpit control system designed to facilitate efficient control over ground movement of aircraft equipped with an engine-free electric taxi system that provides a maximum amount of visual information relating to electric taxi system operation and requires minimal input from and distraction to pilots to operate to control taxi.

It is a further object of the present invention to provide a cockpit control system and method designed to integrate optimal control over ground travel powered by an aircraft's engine-free electric taxi system and ground travel powered by an aircraft's main engines to move the aircraft with maximal efficiency by the engine-free taxi system or by the main engines during taxi.

It is yet another object of the present invention to provide a cockpit panel display for a cockpit control system in an aircraft equipped with an engine-free electric taxi that is configured to display visually to a pilot and cockpit crew the information required to drive the aircraft with maximal efficiency and minimal input during taxi.

It is yet a further object of the present invention to provide a method for efficiently controlling ground travel in an aircraft equipped with an engine-free electric taxi system for autonomous ground movement that employs a cockpit control system that can be operated with minimal mechanical or other input from the pilot and/or crew to achieve a substantially hands free optimum control of aircraft ground travel.

It is yet an additional object of the present invention to provide a cockpit control system for controlling aircraft ground movement in aircraft equipped with an engine-free electric taxi system that is designed to be easily retrofitted into an aircraft cockpit when an engine-free electric taxi system is retrofitted on the aircraft.

It is a still further object of the present invention to provide a cockpit control system for controlling ground movement in an aircraft equipped with an engine-free electric taxi system that is designed to be uninterruptible by unauthorized persons.

In accordance with the aforesaid objects, a cockpit control system and method for efficiently controlling ground travel in an aircraft equipped with an engine-free electric taxi system are provided. The cockpit control system is configured with a display that provides a maximum amount of information visually during aircraft ground movement with a minimal amount of input from and distraction to pilots to facilitate the control of engines-free taxi to produce substantially hands free taxi operation and control. Constant pilot hand or other input is not required to achieve safe and maximally efficient aircraft ground travel powered by the aircraft's engine-free electric taxi system. The present cockpit control system and method enables optimal control over aircraft ground travel so that the aircraft is moved safely and with maximum efficiency by the engine-free electric taxi system, or by the aircraft's engines, as appropriate in selected defined conditions, to achieve this maximum efficiency. The system may further be designed to be uninterruptible by unauthorized persons.

Other objects and advantages will be apparent from the following description, claims, and drawings.

BRIEF DESCRIPTION OF THE DRAWINGS

FIG. 1 illustrates diagrammatically an overview of a cockpit control system in accordance with the present invention, illustrating operation of a system test procedure and a drive procedure useful in an aircraft equipped with an engine-free electric taxi system and with the present cockpit control system;

FIGS. 3a and 3b are enlarged views of designated portions of the system test procedure flow chart, the cockpit control panel, and the flow chart key of FIG. 1.

DESCRIPTION OF THE INVENTION

Figure 2:
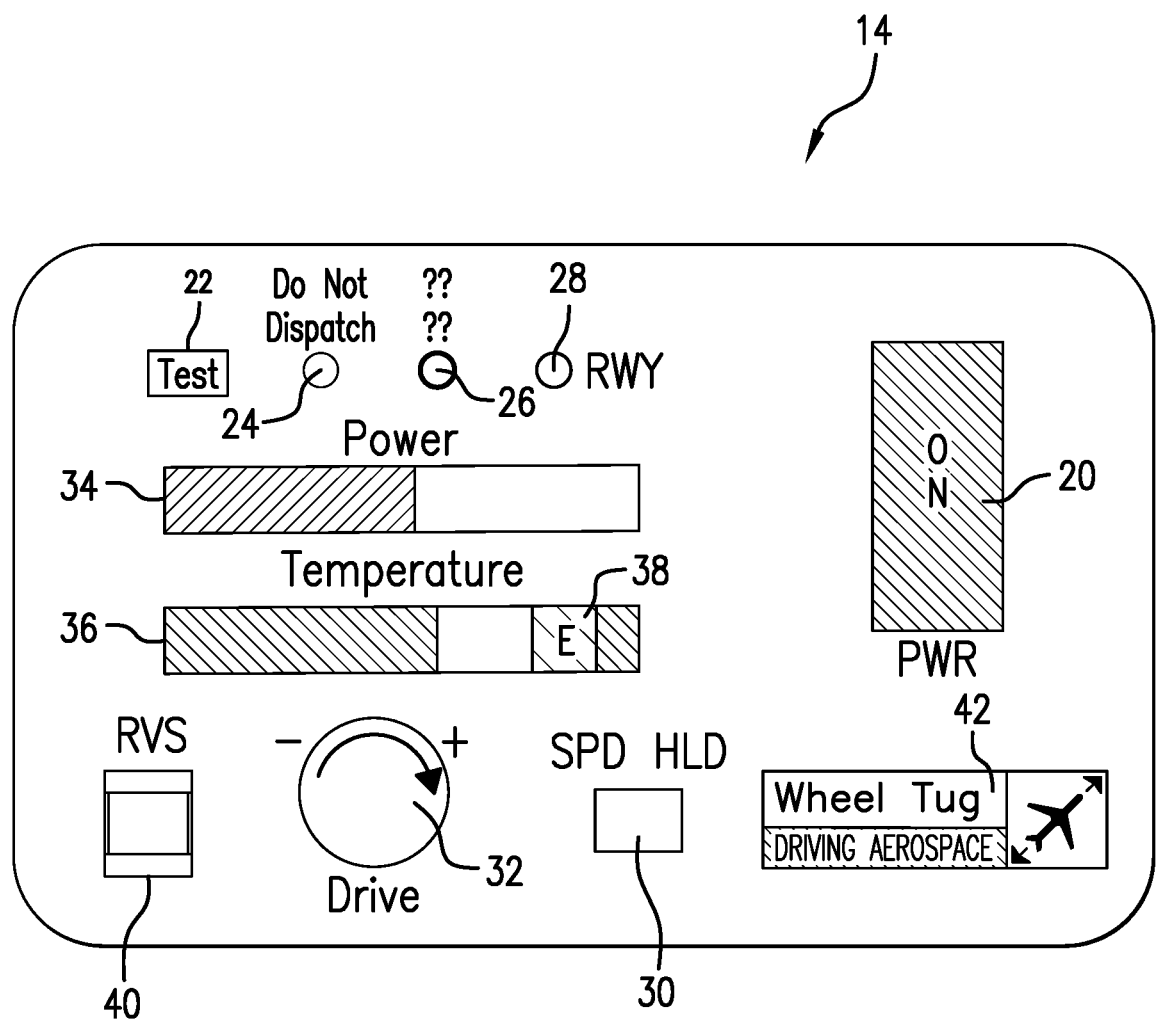
FIG. 2 illustrates one embodiment of a cockpit control display panel design in accordance with the present invention that can be retrofitted into the cockpit of an aircraft equipped with an engine-free electric taxi system.

The cockpit control system and method of controlling aircraft ground travel of the present invention enable a pilot and/or cockpit crew member to have maximum, essentially hands free control over ground travel in an aircraft equipped with an engine-free electric taxi system to control autonomous ground movement. The present system and method provide optimum pilot and cockpit crew control for achieving safe and maximally efficient aircraft ground travel. Most aircraft ground travel will be controlled and powered by the aircraft's engine-free electric taxi system, but, alternatively, may be powered by the aircraft's engines if required, depending on the presence of selected engine-free electric taxi system operating conditions, as well as environmental and/or other factors affecting the efficiency of aircraft ground travel in a particular situation. A cockpit control display panel, preferably configured as described below, is designed to quickly and easily provide visually a maximum amount of information relating to aspects of an aircraft's ground travel with only a minimal amount of input from and distraction to a pilot. The pilot or another cockpit crew member can set and monitor operation of engine-free taxi and, when selected defined conditions warrant, activate engines-on taxi to ensure the safety and maximum efficiency of aircraft ground travel.

A preferred aircraft engine-free electric taxi system useful with the present invention has one or more electric drive means drivingly mounted to power one or more aircraft nose and/or main landing gear wheels and is controllable to move the aircraft on the ground. Electric power to drive the electric drive means may be provided by the aircraft's auxiliary power unit (APU) or another convenient suitable source of electric power. One type of engine-free taxi system that includes an electric drive means is described in commonly owned co-pending International Patent Application No. PCT/US/13/51407, filed 19 Jul. 2013, entitled Aircraft Drive Wheel System with Roller Traction Drive System, the disclosure of which is fully incorporated herein. It is contemplated that other engine-free taxi systems may also be used with the cockpit control system and method of the present invention.

The electric drive means in an engine-free electric taxi system in accordance with the present invention may be an electric drive motor and/or motor assembly capable generating the torque required to drive a commercial sized aircraft and may be selected from any type of suitable electric motor known in the art. One drive means preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of electric motor capable of high torque operation across a desired speed range that can be integrated into an aircraft landing gear wheel and controlled to move an aircraft autonomously during ground travel, including, but not limited to, electric induction motors, permanent magnet brushless DC motors, and switched reluctance motors may also be a suitable electric drive means for an engine-free taxi system useful in the present invention.

Figure 3A:
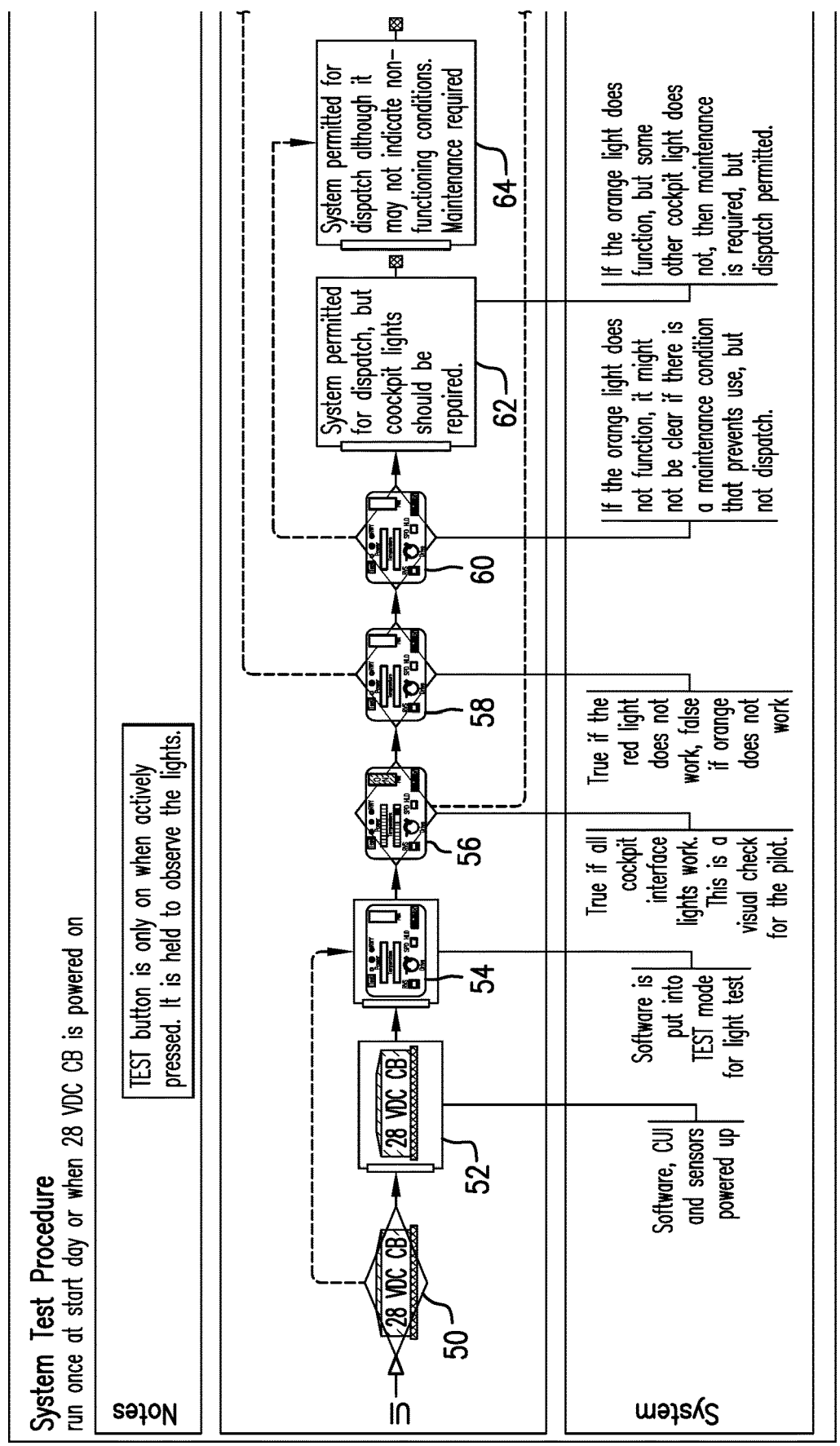

Referring to the drawings, FIG. 1 presents a diagram of an overview of the present cockpit control system and method for controlling ground movement in an aircraft equipped with an engine-free taxi system as described herein. The present system and method, which will be described in more detail in connection with FIGS. 2, 3 and 4, includes a system test procedure, represented by the flow chart 10 and a drive procedure and override conditions, which are represented by the flow charts labeled 12 in FIG. 1. A cockpit control display panel 14 and a key 16 for the flow charts 10 and 12, which will be shown and described in connection with FIGS. 2 and 3, are also shown in FIG. 1. The portions of the system test procedure flow charts that are shown in enlarged views in FIGS. 3a and 3b are so indicated, as are the portions of the drive system and override conditions flow charts shown in enlarged views in FIGS. 4a-4d.

The system test procedure is designed to ensure that the lights and/or other visual indicators on the cockpit control display panel 14 are operating. If, as described in more detail below, all of the lights or other visual indicators are working, and there is no red warning light visible, the aircraft's engine-free electric taxi system may be activated to drive the aircraft on the ground. The drive procedure and override conditions are designed to ensure that the engine-free electric taxi system is operating safely at optimum efficiency while an aircraft is driven autonomously on the ground by the electric taxi system or, when conditions warrant, the aircraft's engines. The control method of the present invention is further designed to deactivate an aircraft's electric taxi system and activate the aircraft's engines to provide the thrust required to move the aircraft on the ground in appropriate situations as described below.

FIG. 2 illustrates one embodiment of a cockpit control display panel 14 for the cockpit control system of an aircraft equipped with an engine-free electric taxi system in accordance with the present invention. This control panel can be installed as a retrofit item in an older aircraft or during construction of the cockpit of a new aircraft. It is designed to provide a maximum amount of visual information to enable a pilot or other crew member to quickly and easily assess an aircraft's ground travel situation and to control virtually all aspects of ground movement between landing and take off of an aircraft equipped with an engine-free electric taxi system, such as that described herein. Only minimal pilot input is required for operation of the system. The shape of the control system display panel may be rectangular as shown in FIG. 2 or any other convenient shape that will enable it to fit within the array of controls in an aircraft cockpit. A preferred configuration and arrangement of switches, knobs, and/or buttons is described. Other configurations and arrangements are also contemplated to be within the scope of the present invention. Additionally, the specific forms of these switches, knobs, and/or buttons may differ from what is described and still operate functionally as described herein and fall within the scope of the present invention. While the visual indicators described are preferred, other indicators, such as, for example without limitation, audible tones designed to communicate information to the pilot and crew could also be used in connection with or instead of the preferred visual indicators.

A main power switch 20 is provided to enable a pilot or other cockpit crew member to manually activate this switch to signal the aircraft's APU to direct a supply of electric power to power the electric drive means of the engine-free electric taxi system and then to shut off the supply of power when the drive means is no longer needed to drive the aircraft or when the drive means should otherwise be shut off when the aircraft engines are operating as described below. A TEST button 22 is provided to enable the pilot to check that lights on the cockpit control panel 14 are working. The TEST button may communicate this information only when actively pressed or in response to any other convenient method of activating it. The lights on the cockpit control display panel 14 that are checked when the TEST button 22 is pressed may include, for example without limitation, a DO NOT DISPATCH light 24, a MAINTENANCE/BAD COMMAND indicator light 26, a SAFE RUNWAY CROSSING (RWY) light 28, and an illuminated SPEED HOLD button 30.

The DO NOT DISPATCH light 24, which may be red, signals the pilot that the aircraft engine-free electric taxi system should not be operated to drive the aircraft. The MAINTENANCE/BAD COMMAND indicator light 26, which is preferably orange, but may be another clearly visible color that is different from the red of the DO NOT DISPATCH light 24, can be designed to communicate different information, depending on whether the light is steady or flashing. A steadily burning indicator light 26 may indicate that maintenance is required, which would lead to an investigation of what maintenance is required before the electric taxi system can be operated or before the aircraft can be dispatched for takeoff. A flashing or blinking indicator light 26 may indicate that a bad command was received, which would lead to a correct command being inputted. Either one of these functions could be indicated as described or as the reverse, in which case a flashing light would signal maintenance and a steady light would signal a bad command.

A SAFE RUNWAY CROSSING (RWY) light 28, indicates that the engine-free electric taxi system has enough power available to enable the aircraft to cross a runway safely in an expedited manner. A SPEED HOLD button 30, which functions essentially like an automobile cruise control button or the like, is illuminated to communicate that this function is operative. The SPEED HOLD button 30 could also be designed to be pushed down to indicate the torque input, in which case a numerical or other torque indicator scale (not shown) may also be provided. In active cruise control, the present control system uses forward radar to maintain minimum spacing during taxi between an aircraft equipped with the present control system and an aircraft immediately ahead of it. An additional button or switch (not shown) may be provided to activate and control this function or, alternatively, this capability could be a built-in function that is activated when a pilot selects a desired ground travel speed.

Other buttons and indicators that communicate various parameters relating to the operation of the electric drive means or other aspects of the operation of the engine-free electric taxi system during ground travel of the aircraft may also be provided on the cockpit control panel 14. A knob 32, labeled DRIVE SPEED, which can be infinitely turned, is provided to adjust drive speed. A target speed display (not shown) may be provided so that the pilot can select a desired ground travel speed by turning the knob 32 to this speed. The control system is designed to operate at this speed without additional pilot input and is able to direct the electric taxi system to accelerate and dial back power when required at higher speeds. Any other suitable device that may be infinitely adjusted, for example, a sliding bar, is also contemplated to be within the scope of the present invention.

A power bar 34 and a temperature bar 36 indicate important operating parameters of the engine-free electric taxi system electric drive means. The electric taxi system reduces available power as its temperature increases. The power and temperature bars may be made of individual LED lights of a single color or in a multi-colored rainbow to display a spectrum of colors indicating selected power or temperature measurement information. Scales indicating units of measurement, for example degrees Fahrenheit or Celsius on the temperature bar 36, or percentage of power available on the power bar 34, may also be provided. Alternatively, specific colors may be used to indicate temperature or power ranges. The power bar 34 preferably includes an indicator that shows available power used to communicate to the pilot how much power remains available to operate the system. Alternatively, oranged-out lights on the power bar may be used as indicators of available power. The temperature bar 36 preferably not only indicates drive means and/or other system component temperatures, but also includes an E (engine) light 38 that lights to communicate to the pilot that ground travel conditions or electric taxi system conditions require inactivation of the engine-free electric taxi system and operation of one or more of the aircraft's engines for optimal safe and efficient aircraft ground movement.

A REVERSE (RVS) button or switch 40, which is preferably guarded to prevent inadvertent activation, is activated by the pilot to operate the aircraft engine-free electric taxi system to move the aircraft in a reverse direction. This button will typically be activated to move an aircraft in reverse during pushback. One or more ports, such as SD card port 42, which is behind the logo shown in FIG. 2, are preferably provided on the control panel 14 to receive SD cards or other memory cards. Other lights, indicators, knobs, switches, and/or buttons that may be needed to control and ensure optimal safety and efficiency of ground travel of aircraft equipped with engine-free electric taxi systems may also be included on the display panel 14 and are contemplated to be within the scope of the present invention.

FIGS. 3a and 3b illustrate in more detail a flow chart showing a system test procedure that may be used in connection with the present cockpit control system and method for controlling taxi in an aircraft equipped with an engine-free electric taxi system. FIG. 3b is a continuation of the flow chart of FIG. 3a. The system test procedure, represented in a flow chart format, puts the system into a test mode in which it can be determined whether lights on the cockpit control display panel 14 that represent the cockpit interface with the drive means and components of the aircraft's engine-free electric taxi system are operating properly. A battery 50 is preferably provided to power cockpit control system components, as well as software for operating the electric taxi system, and for sensors and other control components that require a source of electric power separate from that used to power the electric taxi system drive means. One type of battery that may be used is a 28 volt DC C battery. Software, a cockpit unit interface (CUI), sensors, and the like are powered up in the step represented at 52, and the system is put into test mode to determine whether the indicator lights described in connection with FIG. 2 are working properly or if attention to one or more lights or features and processes to which the lights are connected is required. As noted above, the TEST button 22 is only on when it is actively pressed. The system may be designed so that it is necessary to hold the button down to observe the lights on the cockpit control display panel 14. The system is put into test mode for a light test at 54. The results of the light test appear in the representation of the display panel 14 at 56. System software reads the results of the light test as true if all of the cockpit control panel lights are working. This is also a visual check for the pilot. At 58 in the system test procedure, if the red DO NOT DISPATCH light 24 does not work, this is read as true. If, however, the orange MAINTENANCE/BAD COMMAND light 26 does not work, this is read as false at 58.

At step 6o, the orange MAINTENANCE/BAD COMMAND light 26 is evaluated further. If the orange light 26 does not function, whether there is a maintenance condition that prevents use of the electric taxi system, but does not prevent dispatch, may not be clear. In this case, as indicated at step 64, the system will be permitted for dispatch, although non-functioning conditions may not be indicated, and maintenance will be required. If the orange MAINTENANCE/BAD COMMAND LIGHT 26 does function, but one of the other cockpit lights is not functioning, maintenance is required; however, dispatch is permitted. As noted in step 62, the system is permitted for dispatch, but cockpit lights should be repaired.

When the condition described in step 56 is indicated during the system test procedure, namely that all of the cockpit control display panel lights are seen to be functioning, this situation leads to the result in step 66, and the system is permitted for dispatch. However, if the situation is that described in step 58, namely that the red light does not work, the result in step 68 obtains. The system should not be dispatched because of the red light malfunction. If the system is dispatched, there is a possible serious nose landing gear landing risk.

FIG. 3b additionally illustrates the cockpit control panel 14 and a key 16 with the symbols used in the flow charts of FIGS. 3a, 3b and 4a-4d.

Figure 4A:
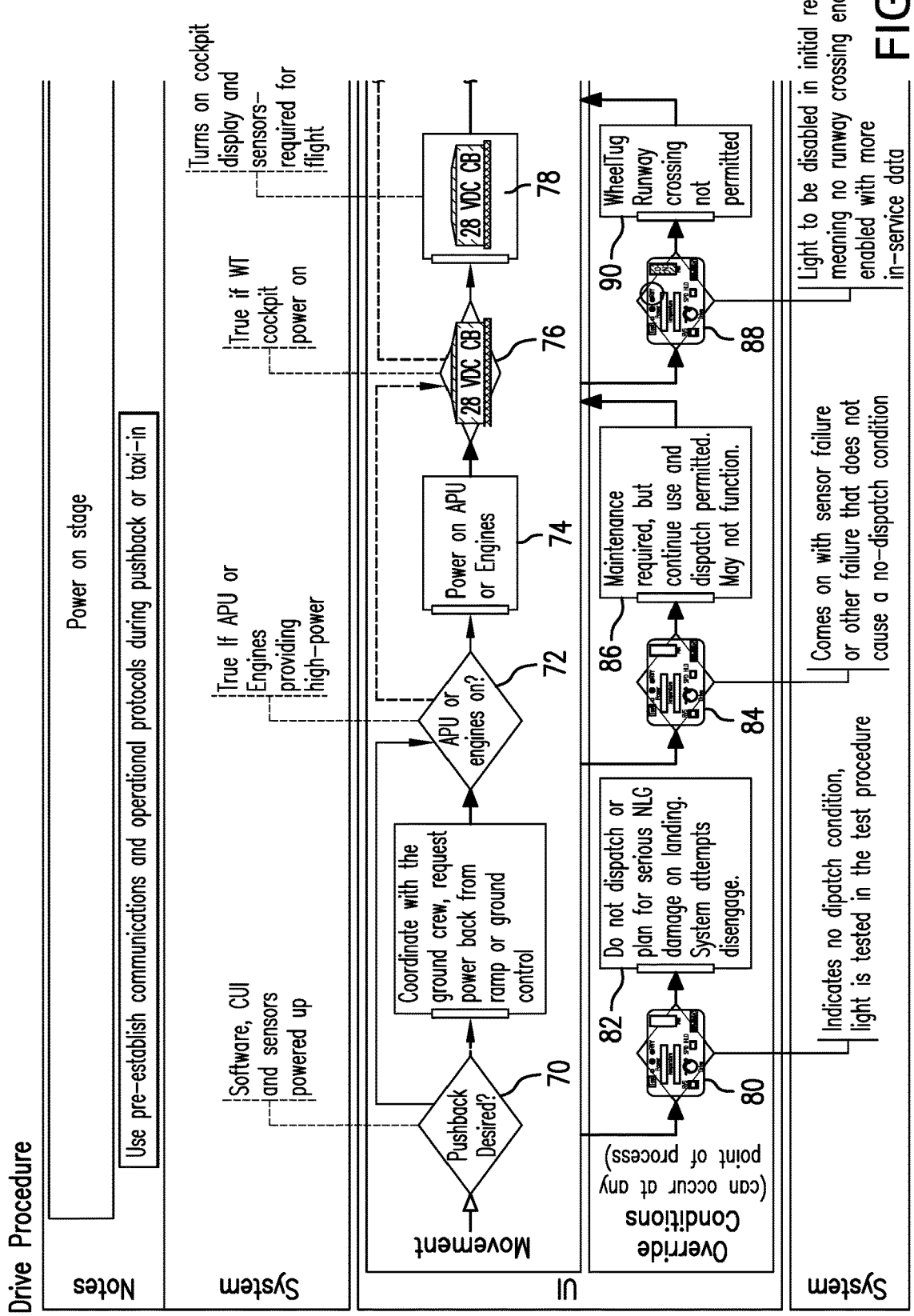
FIGS. 4a, 4b, 4c, and 4d are enlarged views of designated portions of the drive procedure flow charts, including override conditions, of FIG. 1.
Figure 4B:
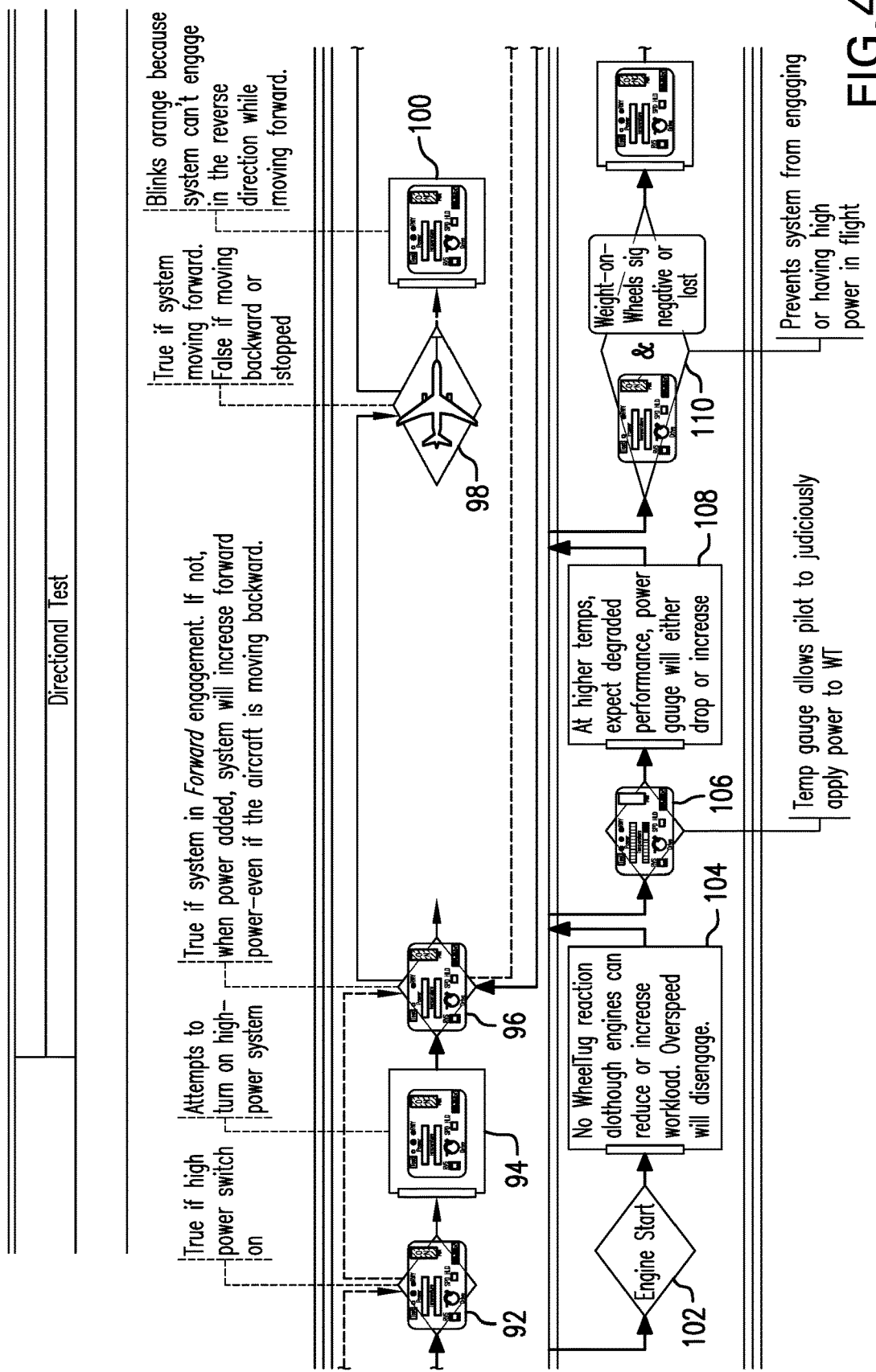
Figure 4C:
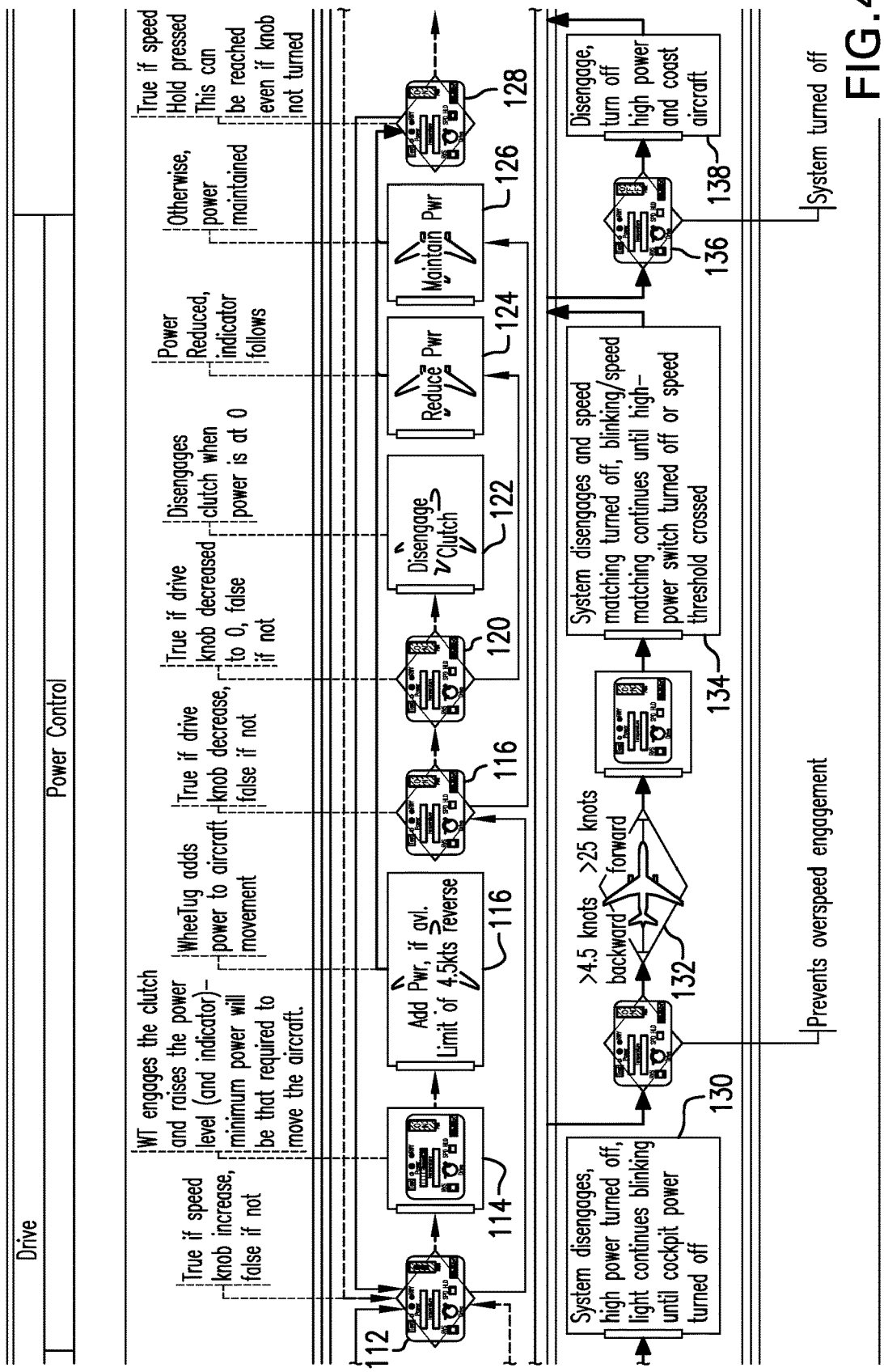
Figure 4D:
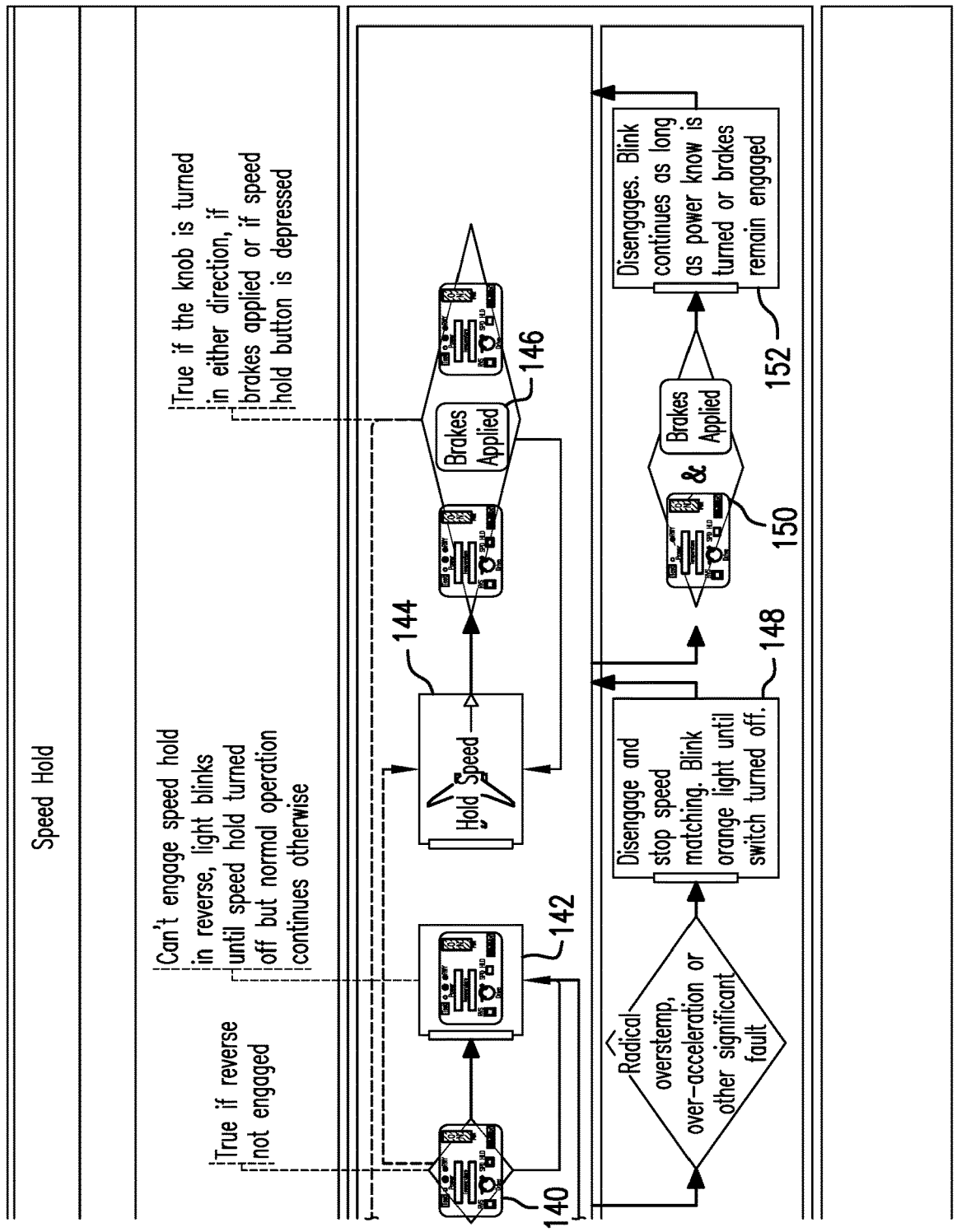

FIGS. 4a-4d present parallel flow charts that represent a drive procedure whereby an aircraft equipped with an engine-free electric taxi system including an electric drive means can be controlled through the cockpit control display panel of FIG. 2 to drive an aircraft on the ground with optimal efficiency. The top flow chart describes ground movement of an aircraft equipped with an engine-free electric taxi system in accordance with the present invention, while the bottom flow chart describes conditions in which override of the system can occur. FIGS. 4b-4d are continuations of the flow charts shown in FIG. 4a. As noted, the flow charts present both aircraft movement and override conditions, which may occur at any point in the process. It is noted that both the aircraft APU and the aircraft engines are referred to as sources of power. For the majority of aircraft ground travel, the APU will be the preferred source of power for the engine-free electric taxi system drive means. The aircraft's engines can also be used in certain defined situations, however. Additionally, other suitable electric power sources are also contemplated for use in supplying electric power. The aircraft ground movement referred to herein includes taxi-in after landing, pushback and taxi-out prior to departure, movement of aircraft between airport ground locations, and any other aircraft ground movement.

The drive system flow chart shown in FIGS. 4a-4d illustrates events during aircraft movement, while the override conditions flow chart describes conditions that can occur at any point in the process which indicate that dispatch should not occur, that maintenance is required, that a runway should not be crossed, or that the system should not be engaged. Pre-established communications and operational protocols are used during pushback or taxi-in with the present engine-free electric taxi and aircraft ground movement control system. In the portion of the drive system flow chart shown in FIG. 4a, the drive system is in a "power on" stage. Software, the cockpit unit interface (CUI), and sensors are powered up as the question of whether movement in the form of pushback is desired is answered, as represented at 70. If pushback is desired, it is necessary to coordinate with the ground crew and request power back from the ramp or ground control. Since the aircraft's APU or engines must be on to provide high power for movement, their status must be checked (72) and either one or the other must be turned on (74). If the engine-free electric taxi system cockpit power is on (76), a 28 VDC C battery 78 turns on the cockpit display panel 14 described above in connection with FIG. 2 and also turns on any sensors. This step is required for flight. The override conditions that can occur as the movement-related steps 70-78 are happening are also shown in FIG. 4a. When cockpit control panel lights are tested in the test procedure and a no dispatch condition is indicated, this is represented at 80. In this case, the engine-free electric taxi system should not be dispatched, or serious nose landing gear damage should be planned for on landing. The system will attempt to disengage (82). A cockpit control panel light may then come on with a sensor failure or another condition that does not cause a no-dispatch condition, as represented at 84. In this case, maintenance is required, but continued use and dispatch of the system is permitted (86). In step 88, the safe runway crossing light is to be disabled in initial release, which means that no runway crossing is enabled, although this could be enabled with more in-service data. As a result, runway crossing with the engine-free electric taxi system is not permitted (90), typically because there is not sufficient power available for the aircraft to cross the runway in an expedited manner.

FIG. 4b is a continuation of the flow chart of FIG. 4a. In steps 92, 94, and 96, if a high power switch is not on, the cockpit control system will attempt to turn the high power system on. This will occur if the engine-free electric taxi system is in forward engagement. If the system is not in forward engagement, when power is added, the system will increase forward power, even if the aircraft is moving backward. In step 98, if the system is moving forward, a true response is indicated, while if the system is moving backward or has stopped, a false response is indicated. In this case, in step 100, the cockpit control display panel DO NOT DISPATCH light 24 (FIG. 2) blinks orange because the engine-free electric taxi system cannot engage in the reverse direction while the aircraft is moving forward.

In the parallel override conditions flow chart, start of the aircraft's engines is indicated at step 102. Step 104 indicates that there is no engine-free electric taxi system reaction, although engines can reduce or increase the system workload, leading to the overspeed disengagement. Step 106 represents the relationship between the temperature reading, as indicated by the temperature bar 36 on the cockpit control display panel 14. (FIG. 2) The aircraft pilot can apply power to the engine-free electric taxi system as required in response to the temperature reading. As indicated at 108, degraded performance can be expected at higher temperatures, and either a drop or increase in power will be shown at the power bar 34. (FIG. 2) Step 110 indicates that the engine-free electric taxi system will be prevented from engaging or having high power in flight when a weight-on-wheels signal is sensed to be significantly negative or lost.

FIG. 4c is a continuation of the flow charts of FIG. 4b. This portion of the process represents a power control and drive part of the process. At step 112, a true response will be indicated if the DRIVE SPEED knob 32 (FIG. 2) is turned to represent an increase in speed, while a false response is indicated if there is no increase in speed. At 114, a clutch in the engine-free electric taxi system is engaged, which actuates a preferred roller traction drive or other drive system to activate the electric drive means and raises the power level, as indicated by the cockpit control display panel power bar 34 (FIG. 2). A minimum amount of power will be that required to move the aircraft. At 116, power is added to the engine-free electric taxi system to move the aircraft at a desired speed, if power is available. When the aircraft is moving in reverse, the amount of power is limited to that required to move the aircraft at less than about 4.5 knots. At step 118, power will be added to the engine-free electric taxi system to produce aircraft movement if the DRIVE SPEED knob 32 is turned in a direction that will decrease speed (true), but power will not be added if the speed is not decreased (false). At step 120, power will be added to the engine-free electric taxi system if the DRIVE SPEED knob 32 is turned to decrease speed to zero (true) or not added if the knob is not turned to zero (false). When power to the system is at zero, an engine-free electric taxi system clutch is disengaged, as represented at 122. Power reduction is represented at 124, which will be indicated at the power bar 34 (FIG. 2). Otherwise, power is maintained as needed to indicate whether a reverse speed limit of 4.5 knots has been reached. This speed limit will be reached if the SPEED HOLD button 30 (FIG. 2) is pressed or otherwise activated, although the limit may be reached even if the DRIVE SPEED knob 32 is not turned.

In the override conditions flow chart portion shown in FIG. 4c, the information discussed in connection with step 110 in FIG. 4b results, at step 130, in disengagement of the engine-free electric taxi system. The high power is turned off. The MAINTENANCE/BAD COMMAND light 26 (FIG. 2) will continue to blink until cockpit power is turned off. At step 132, engagement of the engine-free electric taxi system is prevented when the aircraft is moving faster than defined speed limits so that an overspeed condition exists. This is defined at 132 as speeds greater than 4.5 knots when an aircraft is moving in reverse and greater than 25 knots when an aircraft is moving forward. Under some circumstances different speed limits may be appropriate and can be applied. As indicated at 134, to prevent engagement when an overspeed condition exists, the engine-free electric taxi system disengages and speed matching is turned off. Speed matching continues to be suspended and the MAINTENANCE/BAD COMMAND light 26 continues to blink until either the cockpit control high power switch is turned off or a speed threshold is crossed. At 136, the main power switch 20 on the cockpit control panel is indicated to be in an off position, which, as further indicated in step 138, disengages the engine-free electric taxi system. The high power is turned off, and the aircraft coasts.

FIG. 4d, which is a continuation of the flow charts of FIG. 4c, shows the engine-free electric taxi system in a speed hold condition. At step 140, a true response is indicated if reverse on the engine-free electric taxi system is not engaged. Step 142 notes that the speed hold function cannot be engaged when the system is in reverse. The MAINTENANCE/BAD COMMAND light 26 will blink until the speed hold function is turned off at the SPEED HOLD button 30. Normal operation will continue otherwise. At 144, the aircraft is in a speed hold condition. The aircraft will continue to hold its speed if it is not traveling in reverse and, as indicated at step 146, if the DRIVE SPEED knob 32 is turned in either of the two possible directions, if the aircraft's brakes are applied, or if the SPEED HOLD button 30 is depressed to activate the speed hold function.

In the override conditions flow chart of FIG. 4d, the engine-free electric taxi system will disengage and stop speed matching, as indicated at step 148, if a significant fault, including excessively high temperature, over-acceleration, or the like, occurs. The MAINTENANCE/BAD COMMAND light 26 will blink orange until the main power switch 20 is turned off. As indicated at step 150, the aircraft brakes can be applied to reduce speed. At step 152, the engine-free electric taxi system disengages. The MAINTENANCE/BAD COMMAND light 26 will continue to blink as long as the main power switch 20 is turned on or the aircraft brakes remain engaged.

There are various feedback loops in the drive procedure that are shown in the flow charts represented in FIGS. 4a-4d that have not been discussed in detail. These feedback loops are included in the drive procedure to indicate the ways in which the drive procedure controls the drive, power control, and speed hold segments of the procedure to enable an engine-free electric taxi system as described herein to safely and efficiently move an aircraft on the ground, subject to the override conditions shown and described in connection with FIGS. 4a-4d.

The engine-free electric taxi system described herein may be used to power and control almost all aircraft ground travel. There may be some situations, however, in which operation of the aircraft engines could more effectively power ground travel. A visual indicator, such as the E light 38 shown in FIG. 2, may be provided on the cockpit control panel 14, as discussed above, to quickly and easily inform the aircraft pilot that the aircraft can be powered more efficiently during ground movement by the engines than by the engine-free electric taxi system. Such situations may include, for example without limitation, movement of the aircraft or operation of the engine-free electric taxi system for a set amount of time at maximum system torque before the control system reduces power to avoid exceeding heat limits. Other situations in which aircraft ground travel is more effectively or efficiently controlled by the aircraft engines rather than the engine-free electric taxi system may also arise during aircraft ground travel in some environmental or other conditions, and these are also contemplated to fall within the scope of the present invention.

In addition, the cockpit control system for engine-free electric taxi described herein could be modified to prevent unauthorized access to the system as the aircraft is being controlled during ground movement in the event that the security of the cockpit control display panel is jeopardized by potential access by unauthorized persons. The control system may include automatic control means (not shown) that may be automatically or manually engaged from within the cockpit or remotely to ensure that the engine-free electric taxi system continues to operate without interruption to move the aircraft on the ground. Once the automatic control means is engaged in this situation, it cannot be disengaged, except under clearly defined conditions. An example of one kind of system that could be modified to accomplish this result is described by Brown et al in U.S. Pat. No. 7,142,971, the disclosure of which is fully incorporated herein by reference.

While the present invention has been described with respect to preferred embodiments, this is not intended to be limiting, and other arrangements and structures that perform the required functions are contemplated to be within the scope of the present invention.

INDUSTRIAL APPLICABILITY

The cockpit control system and method for controlling aircraft ground movement of the present invention will find its primary applicability where it is desired to facilitate maximum control over efficient aircraft ground travel in aircraft equipped with engine-free electric taxi systems.

The invention claimed is:

1. A cockpit control system that facilitates operation and control of engine-free electric taxi drive systems with minimal pilot input and efficiently controls ground travel in aircraft equipped with the engine-free electric taxi drive systems powering aircraft ground movement, comprising:
   a. a cockpit control system in an aircraft equipped for powered ground movement with nose or main landing gear wheel-mounted electric taxi drive systems, comprising at least electric drive motors, mounted in operative and control communication with said engine-free electric taxi drive systems, with control system software and processors, and with a source of power on the aircraft in communication with said electric drive motors; and
   b. a cockpit control display panel with a plurality of input, indicator, and control components for said engine-free electric taxi system interfacing with said cockpit control system, wherein said plurality of input, indicator, and control components comprise at least a manually activatable Power switch, a TEST button, a SPEED HOLD button, a guarded REVERSE button or switch, a DRIVE SPEED knob, lights indicating at least DO NOT DISPATCH, MAINTENANCE/BAD/COMMAND, and SAFE RUNWAY CROSSING, and indicators for operating parameters of said engine-free electric taxi drive systems and readiness for dispatch of said engine-free electric taxi drive systems.

2. The system of claim 1, wherein said plurality of indicator components comprise selectively colored blinking or steadily burning lights and indicator bars visible to a pilot in a cockpit of said aircraft indicating at least DO NOT DISPATCH, MAINTENANCE/BAD/COMMAND, and SAFE RUNWAY CROSSING and readiness for dispatch and operating parameters of said engine-free electric taxi systems.

3. The system of claim 1, wherein said operating parameters of said engine-free electric taxi drive systems comprise at least electric drive motor power, electric drive motor temperature, safe electric drive motor or aircraft dispatch, safe runway cross, and system maintenance.

4. The system of claim 2, wherein said TEST button comprises an input component operative to indicate a functional condition of said plurality of indicator components.

5. The system of claim 1, wherein said DRIVE SPEED knob comprises a drive speed adjustment input component infinitely movable to control drive speed of said engine-free electric taxi drive systems.

6. The system of claim 1, wherein said SPEED HOLD button comprises an input component activatable to control speed or torque of said electric drive motors and speed of forward movement of said aircraft.

7. The system of claim 1, wherein said guarded REVERSE button or switch comprises a reverse direction control input component activatable to direct said electric drive motors to move said aircraft in a reverse direction only when said aircraft should be moved in said reverse direction and a guard element to prevent inadvertent activation of said REVERSE button or switch.

8. The system of claim 1, wherein said cockpit control display panel plurality of indicator components further comprises a visual engine operation indicator component operative to communicate to a pilot that main engines and not said engine-free electric taxi drive systems should move said aircraft during ground movement.

9. The system of claim 1, wherein said cockpit control display panel plurality of indicator components further comprises visual indicator bars or lights representing at least power level and temperature of said electric drive motors in said engine-free electric taxi drive systems.

10. The system of claim 3, wherein said cockpit control display panel plurality of input and control components comprise buttons or knobs requiring minimal input by a pilot of said aircraft to control said operating parameters of said engine-free electric taxi drive systems.

11. The system of claim 1, wherein said cockpit control display panel further comprises an override control component operative manually by a pilot of said aircraft or remotely to control operation of said electric taxi systems and aircraft ground movement when defined override conditions are present.

12. The system of claim 1, wherein said cockpit control display panel indicator components comprise lights in colors selected to visually indicate information associated with said lights and identified by said selected colors.

13. The system of claim 1, wherein said cockpit control display panel further comprises a system test of said software and said indicator components manually activated by said Power switch and said TEST button, said DO NOT DISPATCH light comprises a red light and said MAINTE- NANCE/BAD COMMAND light comprises an orange light, and said system test indicates to a pilot functioning or nonfunctioning of one or both of said lights.

14. The system of claim 1, further comprising a battery to power said cockpit control display panel plurality of input, indicator, and control components.

15. The system of claim 1, wherein said cockpit control display panel plurality of indicator components further comprise audio components in addition to or replacing said lights indicating at least DO NOT DISPATCH, MAINTENANCE/BAD/COMMAND, and SAFE RUNWAY CROSSING, and indicators for operating parameters of said engine-free electric taxi drive systems and readiness for dispatch of said engine-free electric taxi drive systems.

* * * * *